United States Patent Office 2,964,478
Patented Dec. 13, 1960

2,964,478
PROCESS FOR BREAKING EMULSIONS OF THE OIL-IN-WATER CLASS

Louis T. Monson, La Puente, Calif., assignor to Petrolite Corporation, Wilmington, Del., a corporation of Delaware No Drawing. Filed Jan. 13, 1958, Ser. No. 708,362

16 Claims. (Cl. 252—331)

This invention relates to a process for resolving or separating emulsions of the oil-in-water class, by subjecting the emulsion to the action of certain chemical reagents.

Emulsions of the oil-in-water class comprise organic oily materials, which, although immiscible with water or aqueous or non-oily media, are distributed or dispersed as small drops throughout a continuous body of non-oily medium. The proportion of dispersed oily material is in many and possibly most cases a minor one.

Oil-field emulsions containing small proportions of crude petroleum oil relatively stably dispersed in water or brine are representative oil-in-water emulsions. Other oil-in-water emulsions include: steam cylinder emulsions, in which traces of lubricating oil are found dispersed in condensed steam from steam engines and steam pumps; wax-hexane-water emulsions, encountered in dewaxing operations in oil refining; butadiene tar-in-water emulsions, in the manufacture of butadiene from heavy naphtha by cracking in gas generators, and occurring particularly in the wash box waters of such systems; emulsions of "flux oil" in steam condensate produced in the catalytic dehydrogenation of butylene to produce butadiene; styrene-in-water emulsions, in synthetic rubber plants; synthetic latex-in-water emulsions, in plants producing co-opolymer butadiene-styrene or GRS synthetic rubber; oil-in-water emulsions occurring in the cooling water systems of gasoline absorption plants; pipe press emulsions from steam-actuated presses in clay pipe manufacture; emulsions of petroleum residues-in-diethylene glycol, in the dehydration of natural gas.

In other industries and arts, emulsions of oily materials in water or other non-oily media are encountered, for example, in sewage disposal operations, synthetic resin emulsion paint formulation, milk and mayonnaise processing, marine ballast water disposal, and furniture polish formulation. In cleaning the equipment used in processing such products, diluted oil-in-water emulsions are inadvertently, incidentally, or accidentally produced. The disposal of aqueous wastes is, in general, hampered by the presence of oil-in-water emulsions.

Essential oils comprise non-saponifiable materials like terpenes, lactones, and alcohols. They also contain saponifiable esters or mixtures of saponifiable and non-saponifiable materials. Steam distillation and other production procedures sometimes cause oil-in-water emulsions to be produced, from which the valuable essential oils are difficulty recoverable.

In all such examples, a non-aqueous or oily material is emulsified in an aqueous or non-oily material with which it is naturally immiscible. The term "oil" is used herein to cover broadly the water-immiscible materials present as dispersed particles in such systems. The non-oily phase obviously includes diethylene glycol, aqueous solutions, and other non-oily media in addition to water itself.

The foregoing examples illustrate the fact that, within the broad genus of oil-in-water emulsions, there are at least three important sub-genera. In these, the dispersed oily material is respectively non-saponifiable, saponifiable, and a mixture of non-saponifiable and saponifiable materials. Among the most important emulsions of non-saponifiable material in water are petroleum oil-in-water emulsions. Saponifiable oil-in-water emulsions have dispersed phases comprising, for example, saponifiable oils and fats and fatty acids, and other saponifiable oily or fatty esters and the organic components of such esters to the extent such components are immiscible with aqueous media. Emulsions produced from certain blended lubricating compositions containing both mineral and fatty oil ingredients are examples of the third subgenus.

Oil-in-water emulsions contain widely different proportions of dispersed phase. Where the emulsion is a waste product resulting from the flushing with water of manufacturing areas or equipment, the oil content may be only a few parts per million. Resin emulsion paints, as produced contain a major proportion of dispersed phase. Naturally-occurring oil-field emulsions of the oil-in-water class carry crude oil in proportions varying from a few parts per million to about 20%, or even higher in rare cases.

The present invention is concerned with the resolution of those emulsions of the oil-in-water class which contain a minor proportion of dispersed phase, ranging from 20% down to a few parts per million. Emulsions containing more than about 20% of dispersed phase are commonly of such stability as to be less responsive to the presently disclosed reagents, possibly because of the appreciable content of emulsifying agent present in such systems, whether intentionally incorporated for the purpose of stabilizing them, or not.

Although the present invention relates to emulsions containing as much as 20% dispersed oily material, many if not most of them contain appreciably less than this proportion of dispersed phase. In fact, most of the emulsions encountered in the development of this invention have contained about 1% or less of dispersed phase. It is to such oil-in-water emulsions having dispersed phase volumes of the order of 1% or less to which the present process is particularly directed. This does not mean that any sharp line of demarcation exists, and that, for example, an emulsion containing 1.0% of dispersed phase will respond to the process, whereas one containing 1.1% of the same dispersed phase will remain unaffected; but that, in general, dispersed phase proportions of the order of 1% or less appear most favorable for application of the present process.

In emulsions having high proportions of dispersed phase, appreciable amounts of some emulsifying agent are probably present, to account for their stability. In the case of more dilutes emulsions, containing 1% or less of dispersed phase, there may be difficulty in accounting for their stability on the basis of the presence of an emulsifying agent in the conventional sense. For example, steam condensate frequently contains very small proportions of refined petroleum lubricating oil in extremely stable dispersion; yet neither the steam condensate nor the refined hydrocarbon oil would appear to contain anything suitable to stabilize the emulsion. In such cases, emulsion stability must probably be predicated on some basis other than the presence of an emulsifying agent.

The present process, as stated above, appears to be effective in resolving emulsions containing up to about 20% of dispersed phase. It is particularly effective on emulsions containing not more than 1% of dispersed phase, which emulsions are the most important, in view of their common occurrence.

The present process is not believed to depend for its effectiveness on the application of any simple laws, because it has a high level of effectiveness when used to resolve emulsions of widely different composition, e.g., crude or refined petroleum in water or diethylene glycol, as well as emulsions of oily materials like animal or vegetable oils or synthetic oily materials in water.

Some emulsions are by-products of manufacturing procedures, in which the composition of the emulsion and its ingredients is known. In many instances, however, the emulsions to be resolved are either naturally-occurring or accidentally or unintentionally produced; or in any event they do not result from a deliberate or premeditated emulsification procedure. In numerous instances, the emulsifying agent is unknown; and as a matter of fact an emulsifying agent, in the conventional sense, may be felt to be absent. It is obviously very difficult or even impossible to recommend a resolution procedure for the treatment of such latter emulsions, on the basis of theoretical knowledge. Many of the most important applications of the present process are concerned with the resolution of emulsions which are either naturally-occurring or are accidentally, unintentionally, or unavoilably produced. Such emulsions are commonly of the most dilute type, containing about 1% or less of dispersed phase, although concentrations up to 20% are herein included, as stated above.

The process which constitutes the present invention consists in subjecting an emulsion of the oil-in-water class to the action of a reagent or demulsifier of the kind subsequently described, thereby causing the oil particles in the emulsion to coalesce sufficiently to rise to the surface of the non-oily layer (or settle to the bottom, if the oil density is greater), when the mixture is allowed to stand in the quescent state after treatment with the reagent or demulsifier.

Applicability of the present process can be readily determined by direct trial on any emulsion, without reference to theoretical considerations. This fact facilitates its application to naturally-occurring emulsions, and to emulsions accidentally, unintentionally, or unavoidably produced; since no laboratory experimentation, to discover the nature of the emulsion components or of the emulsifying agent, is required.

The reagents employed as demulsifiers are ultra high molecular weight polymers of oxirane compounds, for example, alkylene oxides. Thus, they comprise ethylene oxide, propylene oxide, butylene oxide and other members of the homologous series. They also include copolymers thereof wherein the alkylene oxide units are coreacted to form random copolymers

—AABAABAAABBB— or they are reacted in an alternate manner to form block copolymers —BBBAAABBBAAABBB— wherein A is the unit derived from one alkylene oxide, for example, ethylene oxide, and B is the unit of a second alkylene oxide, for example, propylene oxide. They also include terpolymers, or higher copolymers polymerized randomly or in a block-wise fashion. In fact, any ultra high molecular weight polyalkylene oxide can be employed. By "an ultra high molecular weight polymer" I means polyoxirane polymers, such as polyalkylene oxide having a molecular weight of at least about 100,000 upward to about 4.5 million or higher, for example, 450,000 to 4.5 million, but preferably 2–3 million.

For simplicity of discussion, I will describe the reagent which is the prefered demulsifier, namely, ultra high molecular weight polyethylene oxide. This type of polymer is available under the trademark "Polyox" and is sold by Carbide & Carbon Chemical Company. It has been described by F. E. Bailey, Jr., in an article entitled "Physical Chemical Characterization of 'Polyox' Water-Soluble Resins," published by the Research Department of Union Carbide Chemical Company on October 1, 1957, as follows:

"Polyox water-soluble resins are a new class of high molecular weight polymers derived primarily from ethylene oxide. Ethylene oxide, one of the largest volume industrial chemical intermediates, is in addition, the source of most all-winter antifreeze formulations and of the familiar polyethylene glycols and the Carbowax compounds. The liquid polyglycols and rather low molecular weight polyethylene glycol waxes are made by putting together up to 500 ethylene oxide molecular units to form fairly long, linear structures. The largest of these polymer molecules form solid, brittle, wax-like, water-soluble products.

"Using new polymerization techniques discovered in the Union Carbide laboratories, it is now possible to put together 10,000 to 100,000 ethylene oxide molecular units to form enormously long polymer chains which are truly plastic materials that can be molded, formed into films or oriented as fibers. These polymers, in spite of their enormous molecular weights, are completely soluble in water at room temperature. Because of their molecular weight and linear chain structure, made up of repeating units of two carbon atoms and one oxygen atom, these water-soluble resins have an unusual thickening power in water solution."

These "Polyox" resins have been more fully described in the following publications of the Research Department of Union Carbide Chemical Company:

(1) " 'Polyox' Water-Soluble Resins," Advance Technical Information Bulletins F–40246 and F–40327;
(2) "Chemical Progress," published by Union Carbide Chemical Co., vol. 4, No. 1, January 1958, p. 1, wherein it is stated: "These resins ('Polyox') are polymers of ethylene oxide, with molecular weights ranging from 100,000 up to several million;"
(3) "Applications and Technology of 'Polyox' Water-Soluble Resins in the Textile Industry," by J. T. Adams and W. R. Martin, Jr.;
(4) "Physical Chemical Characteristics of 'Polyox' Water-Soluble Resins," by F. E. Bailey, Jr.;
(5) "Techniques for Using 'Polyox' Water-Soluble Resins," by K. L. Smith;

in the following papers delivered at the 1957 Fall Meeting of the American Chemical Society:

(1) "High Molecular Weight Polymers of Ethylene Oxide; Polymerization with Alkaline Earth Carbonate Catalysts," by F. N. Hill et al.;
(2) "High Molecular Weight Polymers of Ethylene Oxide; Solution Properties," by F. E. Bailey et al.;
(3) "High Molecular Weight Polymers of Ethylene Oxide; Plastic Properties," by K. L. Smith et al.;

in the following Belgian Patents: 557,830, 557,831, 557,832, 557,833, etc., and in Chemical and Engineering News, November 11, 1957, p. 62.

From these publications it can be seen that these polymers are unique and distinctly different from the polyethylene oxide polymers heretofore known. Since they have 2,000–100,000 units in contrast to the previous polyethylene oxides which have a maximum of 500 ethylene oxide units, they have molecular weights of about 100,000–4,400,000 in contrast to a maximum prior molecular weight about 22,000.

The reagents employed in the practising of my process are sufficiently water-dispersible under the conditions of use as to be miscible with the external phase of the emulsions which are to be resolved. All such emulsions are of the oil-in-water class; and hence they have water, some aqueous liquid, or at least some non-oily liquid as such external phase. Miscibility of the reagent with such phase, in the proportions required, is important if the reagent is to distribute itself throughout the emulsion in such manner as to resolve the latter.

The present reagents are useful because they are able to recover the oil from oil-in-water class emulsions more advantageously and at a lower cost than is possible using other reagents or other processes. In some instances they have been found to resolve emulsions which were not economically or effectively resolvable by any other known means.

The material may be employed in the solid form, or it may be diluted with a suitable solvent. Water has been found to constitute a satisfactory solvent, because of its ready availability at a negligible cost; but in other cases suitable non-aqueous solvents have been employed in preparing reagents which were effective when used for the purpose of resolving oil-in-water emulsions. Because such reagents are frequently effective in proportions of the order of 10 to 50 parts per million, their solubility in the emulsion mixture may be entirely different from their apparent solubility in bulk, in water or oil. Undoubtedly, they have some solubility in both media, within the concentration range employed.

As a guide to the solubility of my preferred reagent, polyethylene oxide, it is to be noted that Polyox resins are soluble in cold acetic acid, acetonitrile, chloroform, ethylene dichloride, isopropanol (91%), methylene dichloride and water and are soluble in hot aromatic hydrocarbons, "Carbitol" solvent, carbon tetrachloride, "Cellosolve" solvent, dioxane, ethylene carbonate, and methanol (anhydrous). However, since they are readily dissolved in water, this is the preferred solvent.

In operating the present process to resolve an oil-in-water emulsion, the reagent is introduced at any convenient point in the system, and it is mixed with the emulsion in any desired manner, such as by being pumped or circulated through the system or by mechanical agitation such as paddles, or by gas agitation. After mixing, the mixture of emulsion and reagent is allowed to stand quiescent until the constituent phases of the emulsion separate. Settling times and optimum mixing times will, of course, vary with the nature of the emulsions and the apparatus available. The operation, in its broadest concept, is simply the introduction of the reagent into the emulsion, the mixing of the two to establish contact and promote coalescence, and, usually, the subsequent quiescent settling of the agitated mixture, to produce the aqueous and non-aqueous emulsion phases as stratified layers.

Agitation may be achieved in various ways. The piping system through which the emulsion is passed during processing may itself supply sufficient turbulence to achieve adequate mixing of reagent and emulsion. Baffled pipe may be inserted in the flow sheet to provide agitation. Other devices such as perforated-chamber mixers, excelsior- or mineral- or gravel- or steel-shaving-packed tanks, beds of stones or gravel or minerals in open ducts or trenches may be employed beneficially to provide mixing. The introduction of a gas, such as natural gas or air, into a tank or pipe in which or through which the mixture of reagent and emulsion is standing or passing is frequently found suitable to provide desired agitation.

It has been found that the factors, reagent feed rate, agitation and settling time are somewhat interrelated. For example, with sufficient agitation of proper intensity the settling time required can be materially shortened. On the other hand, if agitation is relatively non-procurable but extended settling time is, the process may be equally productive of satisfactory results. The reagent feed rate has an optimum range, which is sufficiently wide, however, to meet the tolerances required for the variances encountered daily in commercial operations.

Application of a suitable gas in a procedure approximating that of the froth flotation cell employed in ore beneficiation, after the present reagent has been added to the emulsion to be resolved, frequently has a favorable influence of totally unexpected magnitude. By incorporating the step of subjecting the chemicalized emulsion to the action of air in a sub-aeration type flotation cell, a clear aqueous layer is sometimes obtained in a matter of seconds, without added quiescent settling, and with approximately as much reagent as used in a companion test in which no agitation was used. Such companion test separated a clear aqueous layer only after standing quiescent for hours. Natural gas was found to be as good a gaseous medium as was air in this operation.

It should be distinctly understood that such aeration technique, while an important adjunct to the use of the present reagent, in some cases, is not an equivalent procedure. This may be proved by subjecting an un-chemicalized emulsion to aeration for a period of minutes without detectable favorable effect. Addition of the reagent to such aerated emulsion will produce resolution, promptly.

The details of the mechanical structures required to produce aeration suitable for the present purpose need not be given here. It is sufficient to state that any means capable of producing small gas bubbles within the body of the emulsion is acceptable for use.

The flotation principle has long been employed in the benefication of ores. Many patents in this art illustrate apparatus suitable for producing aeration of liquids. Reference is made to Taggart's "Handbook of Ore Dressing," which describes a large number of such devices.

The principle of aeration has been applied to the resolution of emulsions by Broadbridge, in U.S. Patent No. 1,505,944, and Bailey, in U.S. Patent No. 1,770,476. Neither of these patents discloses or suggests the present invention, as may be seen from an inspection of their contents.

Suitable aeration is sometimes obtainable by use of the principle of Elmore, U.S. Patent No. 326,411. In that ore beneficiation process, an ore pulp was passed through a vacuum apparatus, the application of vacuum liberating very small gas bubbles from solution in the water of the pulp, to float the mineral. A more recent application of this same principle is found in the Dorr "Vacuator."

The manner of practicing the present invention using aeration is clear from the foregoing description.

The order in which the reagent and the aeration step are applied is relatively immaterial. Sometimes it is more convenient to chemicalize the emulsion and subsequently to apply the aeration technique. In others, it may be more advantageous to produce a strongly frothing emulsion and then introduce the reagent into such aerated emulsion.

As stated previously, any desired gas can be substituted for air. Other commonly suitable gases include natural gas, nitrogen, carbon dioxide, oxygen, etc., the gas being used essentially for its levitation effect. If any gas has some deleterious effect on any component of the emulsion, it will obviously be desirable to use instead some other gas which is inert under the conditions of use.

Heat is ordinarily of little importance in resolving oil-in-water class emulsions with my reagent. Still there are some instances where heat is a useful adjunct. This is especially true where the viscosity of the continuous phase of the emulsion is appreciably higher than that of water.

In some instances, importantly improved results are obtained by adjusting the pH of the emulsion to be treated, to an experimentally determined optimum value.

The reagent feed rate also has an optimum range, which is sufficiently wide, however, to meet the tolerances required for the variances encountered daily in commercial operations. A large excess of reagent can produce distinctly unfavorable results.

My reagents may be employed alone, or they may in some instances be employed to advantage admixed with other compatible oil-in-water demulsifiers. Specifically, I have found that they may be advantageously admixed with the reagents disclosed in U.S. Patents Nos. 2,470,829 and 2,589,198 through 2,589,201.

My process is commonly practised simply by introducing small proportions of the reagent into an oil-in-water class emulsion, agitating to secure distribution of the reagent and incipient coalescence, and letting the mixture stand until the oil phase separates. The proportion of reagent required will vary with the character of the emulsion to be resolved. Ordinarily, proportions of reagent required are from about 1/10,000 to about 1/1,000,000 the volume of emulsion treated; but more or less may be required.

A preferred method of practising the process to resolve a petroleum oil-in-water emulsion in as follows: Flow the oil well fluids, consisting of free oil, oil-in-water emulsion, and natural gas, through a conventional gas separator, then to a conventional steel oil-field tank, of, for example, 5,000-bbl. capacity. In this tank the oil-in-water emulsion falls to the bottom, is withdrawn, and is so separated from the free oil. The oil-in-water emulsion, so withdrawn, is subjected to the action of the reagent in the desired small proportion, injection of reagent into the stream of oil-in-water emulsion being accomplished by means of a conventional proportioning pump or chemical feeder. The proportion employed in any instance is determined by trial-and-error. The mixture of emulsion and reagent then flows to a pond or sump wherein it remains quiescent and the previously emulsified oil separates, rises to the surface and is removed. The separated water, containing relatively little to substantially none of the previously emulsified oil, is thereafter discarded.

The following examples are presented for purposes of illustration. They were used to determine the most effective ratios to employ in the preferred process described in the prior paragraph.

*Examples*

Ultra high molecular weight polyethylene oxides, ("Polyox" WSR-35 and "Polyox" WSR-301), were tested on oil-in-water emulsions taken from two currently producing oil wells in the following manner: Natural crude petroleum oil-in-water emulsions were subjected to the above mentioned "polyox" resins (WSR-35 and WSR-301), under the conditions indicated. The mixture of emulsion and demulsifier was agitated for about two minutes at about 150 shakes per minute and then allowed to stand quiescent for about 19 hours. A clean break was noted at all of the concentrations shown under the conditions indicated. A check or control sample processed in the same way except that no reagent was added to it was still a brown emulsion at the end of the period.

Well A:
 (1) 1 part per 10,000, settling temperature 160° F.
 (2) 1 part per 20,000, settling temperature 160° F.
 (3) 1 part per 40,000, settling temperature 160° F.
 (4) 1 part per 80,000, settling temperature 160° F.
Well B:
 (1) 1 part per 10,000, settling temperature both at room temperature and at 130° F.
 (2) 1 part per 20,000, settling temperature both at room temperature and at 130° F.
 (3) 1 part per 40,000, settling temperature both at room temperature and at 130° F.
 (4) 1 part per 80,000, settling temperature both at room temperature and at 130° F.

These results obtained with the present reagents were superior to those obtained by using the best available commercial demulsifier currently used in these wells. In contrast to the commercial demulsifier which showed a peak within the above concentration ranges with performance deteriorating on both sides of the peak, "Polyox" resin showed excellent results over the entire ratio range. Many other examples could be cited, but the general procedure employed in resolving oil-in-water emulsions should be clear from the above descriptions and prior patents referred to therein.

My reagents have likewise been successfully applied to other oil-in-water class emulsions of which representative examples have been referred to above. Their use is therefore not limited to crude petroleum-in-water emulsions.

Having thus described my invention, what I claim as new and desire to secure by Letters Patent is:

1. A process for breaking an emulsion comprising an oil dispersed in a non-oily continuous phase in which the dispersed phase is not greater than about 20%, characterized by subjecting the emulsion to the action of a reagent comprising an ultra high molecular weight polyethylene oxide having a molecular weight of at least about 100,000.

2. The process of claim 1 where the emulsion is a petroleum oil-in-water emulsion.

3. The process of claim 1 where the polyethylene oxide has a molecular weight of 2–3 million.

4. The process of claim 3 where the emulsion is a petroleum oil-in-water emulsion.

5. A process for breaking an emulsion comprising an oil dispersed in a non-oily continuous phase in which the dispersed phase is not greater than about 1%, characterized by subjecting the emulsion to the action of a reagent comprising an ultra high molecular weight polyethylene oxide having a molecular weight of at least about 100,000.

6. The process of claim 5 where the emulsion is a petroleum oil-in-water emulsion.

7. The process of claim 5 where the polyethylene oxide has a molecular weight of 2–3 million.

8. The process of claim 7 where the emulsion is a petroleum oil-in-water emulsion.

9. A process for breaking an emulsion comprising an oil dispersed in a non-oily continuous phase in which the dispersed phase is not greater than about 20%, characterized by subjecting the emulsion to the action of a reagent comprising an ultra high molecular weight lower polyalkylene oxide selected from the group consisting of polyethylene oxide, polypropylene oxide, polybutylene oxide, and copolymers thereof having a molecular weight of at least about 100,000.

10. The process of claim 9 where the emulsion is a petroleum oil-in-water emulsion.

11. The process of claim 9 where the lower polyalkylene oxide has a molecular weight of 2–3 million.

12. The process of claim 11 where the emulsion is petroleum oil-in-water emulsion.

13. A process for breaking an emulsion comprising an oil dispersed in a non-oily continuous phase, in which the dispersed phase is not greater than about 1%, characterized by subjecting the emulsion to the action of a reagent comprising an ultra high molecular weight lower polyalkylene oxide selected from the group consisting of polyethylene oxide, polypropylene oxide, polybutylene oxide and copolymers thereof having a molecular weight of at least about 100,000.

14. The process of claim 13 where the emulsion is a petroleum oil-in-water emulsion.

15. The process of claim 13 where the lower polyalkylene oxide has a molecular weight of 2–3 million.

16. The process of claim 15 where the emulsion is a petroleum oil-in-water emulsion.

References Cited in the file of this patent

UNITED STATES PATENTS 2,159,313  Blair et al. _____ May 23, 1959

OTHER REFERENCES

Chem. and Eng. News, November 11, 1957, page 62.